United States Patent [19]
Ochiai

[11] Patent Number: 5,488,782
[45] Date of Patent: Feb. 6, 1996

[54] SCALE PLATE ARRANGEMENT

[75] Inventor: Osamu Ochiai, Atsugi, Japan

[73] Assignee: Sony Magnescale Inc., Tokyo, Japan

[21] Appl. No.: 235,521

[22] Filed: Apr. 29, 1994

[30] Foreign Application Priority Data

May 13, 1993 [JP] Japan ................................ 5-111462

[51] Int. Cl.⁶ .............................................. G01B 7/02
[52] U.S. Cl. ............................................ 33/708; 33/706
[58] Field of Search ........................... 33/700, 703, 706, 33/707, 708; 324/207.24

[56] References Cited

U.S. PATENT DOCUMENTS

| | | | |
|---|---|---|---|
| 2,875,524 | 3/1959 | Bower et al. | 33/708 |
| 3,816,002 | 6/1974 | Wieg | 33/707 |
| 4,381,609 | 5/1983 | Holstein | 33/708 |
| 4,400,890 | 8/1983 | Ohkubo et al. | 33/708 |
| 4,430,781 | 2/1984 | Meyer | 33/707 |
| 4,484,391 | 11/1984 | Narimatsu | 33/708 |
| 4,570,346 | 2/1986 | Burkhardt | 33/707 |

FOREIGN PATENT DOCUMENTS

| | | |
|---|---|---|
| 0368687 | 5/1990 | European Pat. Off. . |
| 2847719 | 5/1980 | Germany . |
| 3112086 | 3/1982 | Germany ........................... 33/708 |
| 3924154 | 7/1990 | Germany . |
| 0003201 | 1/1988 | Japan ................................. 33/708 |

OTHER PUBLICATIONS

Patent Abstract of Japan, vol. 11, No. 82 (M–571), Mar. 12, 1987.
Patent Abstract of Japan, vol. 17, No. 351 (E–1392), Jul. 2, 1993.

*Primary Examiner*—Thomas B. Will
*Attorney, Agent, or Firm*—Foley & Lardner

[57] ABSTRACT

A scale plate arrangement is adapted to be attached to a machine tool for detecting, for example, position and velocity of an object. The scale plate arrangement includes a scale-plate base and a scale plate which has a scale thereon. The scale plate is welded to the scale-plate base. With this, it is not necessary to use an adhesive or a fixing member to attach the scale plate to the scale-plate base. In case that the scale plate has a magnetic scale and that the scale-plate base is made of a magnetic material, the scale-plate base is formed with a recess which is positioned under the magnetic scale. With this, magnetic influence of the scale-plate base on the magnetic scale can be prevented.

12 Claims, 3 Drawing Sheets

SCALE PLATE ARRANGEMENT

BACKGROUND OF THE INVENTION

1. Field of the Invention

The present invention relates to a scale plate arrangement in which a scale plate is attached to a machine tool or the like through a scale-plate base for detecting position, velocity and the like of an object.

2. Description of the Prior Art

Hitherto, various scale plate arrangements have been proposed. In case that a scale plate is attached to a machine tool or the like, the scale plate is not directly attached to a machine tool because the scale plate is thin in thickness and thus insufficient in rigidity. In fact, the scale plate is usually attached to a scale-plate base which is made of iron, stainless steel or the like and is higher than the scale plate in rigidity. Then, the scale-plate base having thereon the scale plate is attached to a machine tool.

There have been proposed several conventional ways to attach a scale plate to a scale-plate base. For example, there is provided a proposal in which a scale plate is directly attached to a scale-plate base by means of an adhesive. As to the material of the scale-plate base, it is preferable to use iron or a material which has the same temperature expansion coefficient as that of iron. Such material including iron has magnetism. Therefore, in case that the scale plate is a magnetic scale plate, magnetism of the scale-plate base has a bad influence on a magnetic scale (marks) of the magnetic scale plate. In view of this, there is provided another proposal in Which a non-magnetic material plate made of brass or the like is sandwiched between the scale plate and the scale-plate base so as to prevent the above-mentioned bad influence. In fact, the non-magnetic material plate is attached to the scale-plate base by means of an adhesive, and then the scale plate is attached to the non-magnetic material plate by means of an adhesive. However, the above-mentioned two conventional ways to attach a scale plate to a scale-plate base by means of an adhesive have a drawback. That is, until now, an adhesive which is satisfactory with respect to all the necessary conditions in terms of, for example, resistance against a severe environment, temperature characteristics and curing time has not been available. Such adhesive tends to lower accuracy of the scale plate arrangement. Furthermore, the non-magnetic material plate is generally different from iron in temperature expansion coefficient. Therefore, the temperature change lowers accuracy of the scale plate arrangement having the non-magnetic material plate.

There is provided still another proposal in which a scale plate is attached to a scale-plate base through so-called tension blocks. In fact, the blocks are attached to longitudinal end portions of the scale-plate base with an adhesive, and then longitudinal end portions of the scale plate are attached to the blocks with an adhesive while the scale plate is tensioned. However, vibration or impact tends to make the scale plate surface uneven because only the longitudinal end portions of the scale plate are attached to or supported by the blocks.

There is provided a further proposal in which a scale plate is attached to a scale-plate base through bolts. However, this will increase the production cost of the scale plate arrangement due to the use of the bolts.

SUMMARY OF THE INVENTION

It is therefore an object of the present invention to provide a scale plate arrangement which is cheap in price, satisfactory in reliability and free of the above-mentioned drawbacks.

According to the present invention, there is provided a scale plate arrangement comprising a scale-plate base and a scale plate which has a scale thereon and is welded to the scale-plate base. Due to this welding, it is not necessary to use an adhesive or a fixing member to attach the scale plate to the scale-plate base.

In case that the scale plate has an implementation area having a magnetic scale and that the scale-plate base is made of a magnetic material, the scale-plate base is formed with a recess which is positioned under the implementation area. With this, magnetic influence of the scale-plate base on the magnetic scale can be prevented.

DETAILED DESCRIPTION OF THE INVENTION

With reference to FIGS. 1 to 9, a scale plate arrangement according to the present invention will be described in the following.

Figure 1:
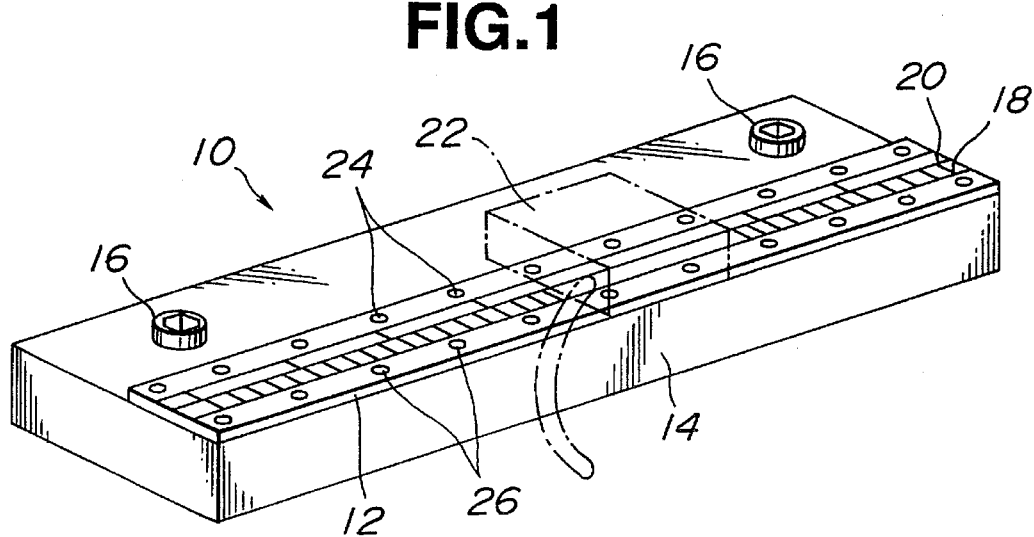
FIG. 1 is a perspective view of a first embodiment of a scale plate arrangement according to the present invention.
Figure 2:
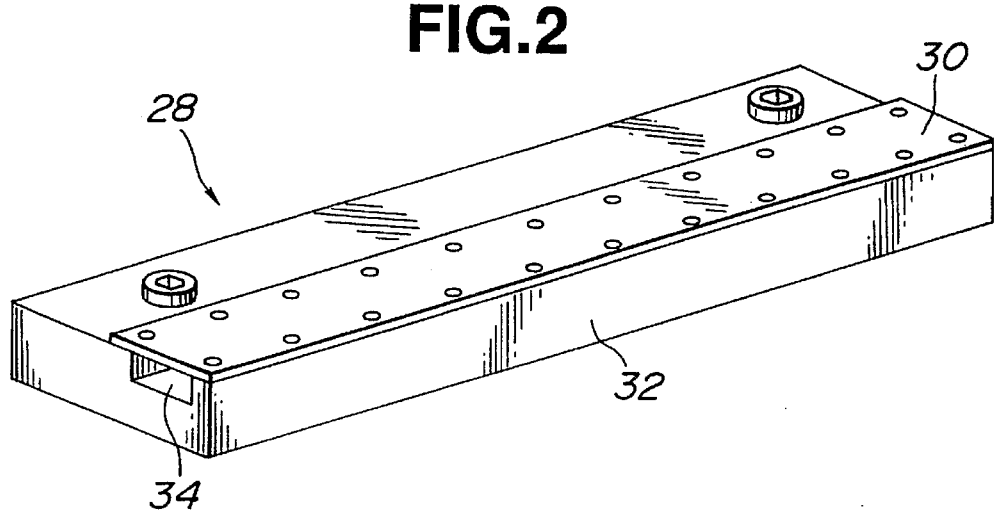
FIG. 2 is a view similar to FIG. 1, but showing a second embodiment of the scale plate arrangement, in which a scale-plate base has a recess.

As is seen from FIG. 1, a first embodiment of a scale plate arrangement 10 according to the present invention comprises a magnetic scale plate 12 and a scale-plate base 14. However, in the invention, the scale plate 12 is not limited to a magnetic scale plate. It is optional to use a reflection type optical scale plate or the like as long as the scale plate 12 is a metal plate which is thin in thickness.

The scale plate 12 is low in rigidity because it is thin in thickness. Thus, it is not suitable to directly attach the scale plate 12 to a machine tool or the like (not shown). Thus, the scale plate 12 is attached to a machine tool or the like through the scale-plate base 14 which is higher than the scale plate 12 in rigidity. In fact, at first, the scale plate 12 is attached to the scale-plate base 14. Then, the scale-plate base 14 having thereon the scale plate 12 is attached to a machine tool or the like through fixing bolts 16.

The scale plate 12 has an incremental track 18 which extends in a longitudinal direction of the scale plate 12 and has a magnetic scale (marks) for detecting the position and a so-called origin track 20 which extends in a longitudinal direction of the scale plate and has a magnetic scale for detecting the standard position. Designated by numeral 22 is a detecting head which implements a readout of the magnetic scale by means of, for example, a magnetoresistance element. A plurality of spots of the scale plate 12, except the incremental track 18 and the origin track 20, are spot-welded in a longitudinal direction of the scale plate 12 to the scale-plate base 14. With this, first and second banks 24 and 26 of welding spots are formed in a longitudinal direction of the scale plate 12. By welding, the scale plate 12 becomes integral with the scale-plate base 14 with a low cost and a high credibility without using an adhesive or a fixing member such as a bolt. With this, the accurate position detection can be conducted even if the temperature changes.

If the temperature expansion coefficient of the scale plate 12 is different from that of the scale-plate base 14, it is necessary to sufficiently increase rigidity of the scale-plate base 14 as compared with that of the scale plate 12. With this, if the temperature changes, contraction or expansion of the scale plate 12 which is perfectly attached to the scale-plate base 14 by welding becomes substantially similar to that of the scale-plate base 14. That is, the temperature expansion coefficient of the scale plate 12 becomes substantially the same as that of the scale-plate base 14. This means that the temperature expansion coefficient of the scale plate 12 can be arbitrarily controlled. For example, if it is necessary to have the temperature expansion coefficient of the scale plate 12 which is the same as that of iron, the material of the scale-plate base 14 is selected from iron (S45C), stainless steel (SUS406) and the like.

If the scale-plate base 14 is made of a magnetic material, the scale-plate base 14 may have a bad influence on the magnetic scale of the scale plate 12. In view of this, as is seen from FIG. 2, there is provided a second embodiment of a scale plate arrangement according to the present invention. The scale plate arrangement 28 comprises a scale plate 30 which is attached to a scale-plate base 32 by spot welding. The scale-plate base 32 has a recess or channel 34 which is positioned under an implementation area of the scale plate 12. The recess 34 is filled with air which functions as a non-magnetic layer. However, it is optional to fill the recess 34 with a non-magnetic material besides air. As compared with the scale plate arrangement 10 shown in FIG. 1, the scale plate arrangement 28 shown in FIG. 2 has a smaller contact area between the scale plate 30 and the scale-plate base 32 due to the provision of the recess 34. However, the scale plate 30 can be welded to the scale-plate base 32 with a sufficient strength by, for example, laser beam spot welding. Attachment strength of the welding is more satisfactory than that of adhesion with an adhesive.

Figure 3:
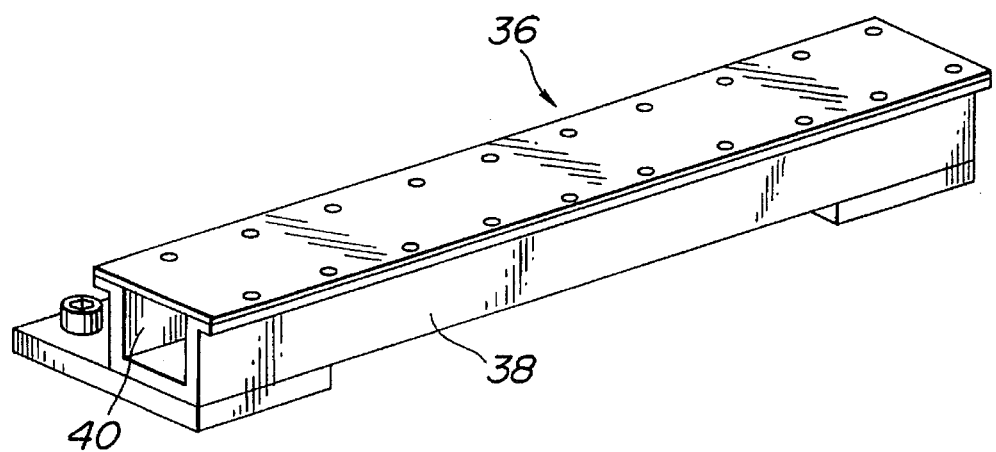
FIG. 3 is a view similar to FIG. 1, but showing a third embodiment of the scale plate arrangement, in which a metal sheet is bent so as to form a scale-plate base and to provide a recess.

FIG. 3 shows a third embodiment of a scale plate arrangement 36 according to the present invention, in which a metal sheet is bent so as to form a scale-plate base 38 and a recess 40.

Figure 4:
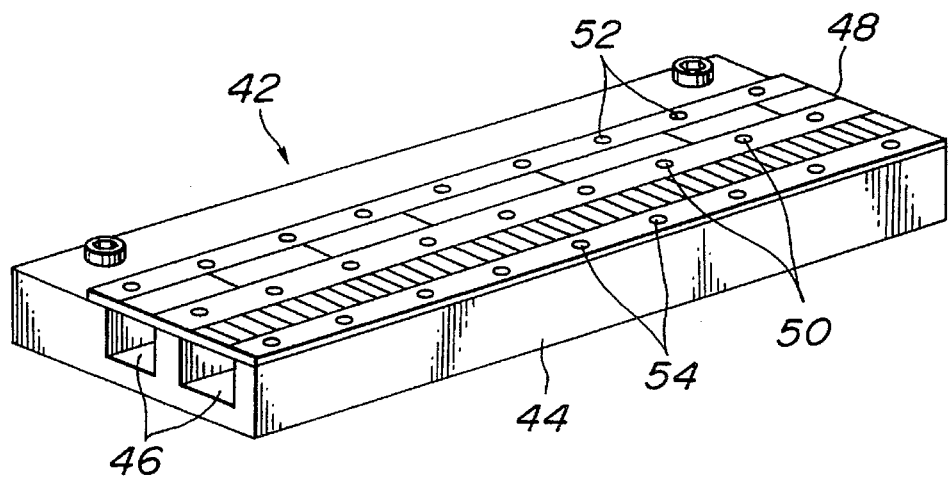
FIG. 4 is a view similar to FIG. 1, but showing a fourth embodiment of the scale plate arrangement, in which a scale-plate base has two parallel recesses.
Figure 5:
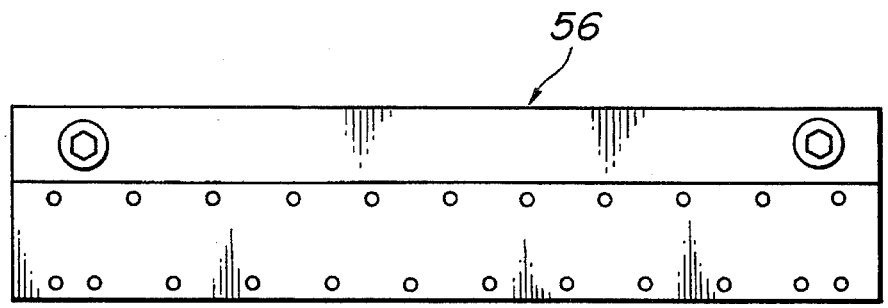
FIG. 5 is a plan view showing a fifth embodiment of the scale plate arrangement, in .which positions and intervals of welding spots are varied.
Figure 6:
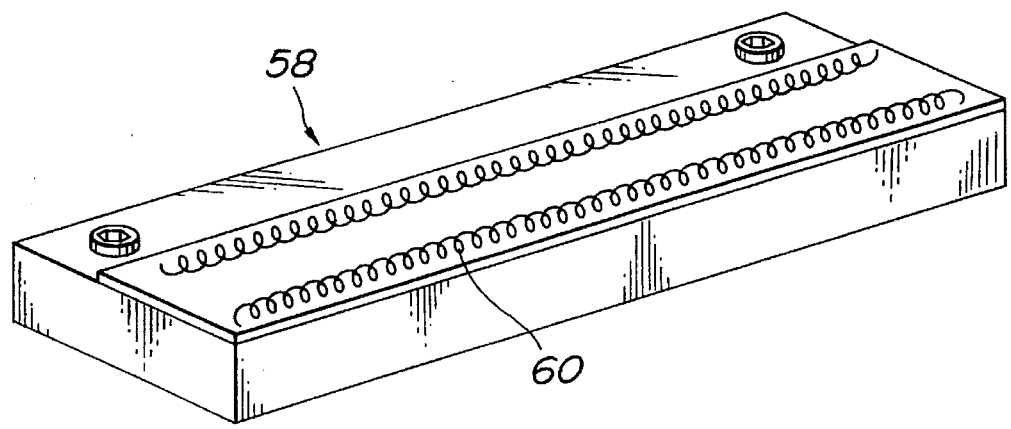
FIG. 6 is a view similar to FIG. 1, but showing a sixth embodiment of the scale plate arrangement, in which a scale plate is attached to a scale-plate base through seam weld.
Figure 7:
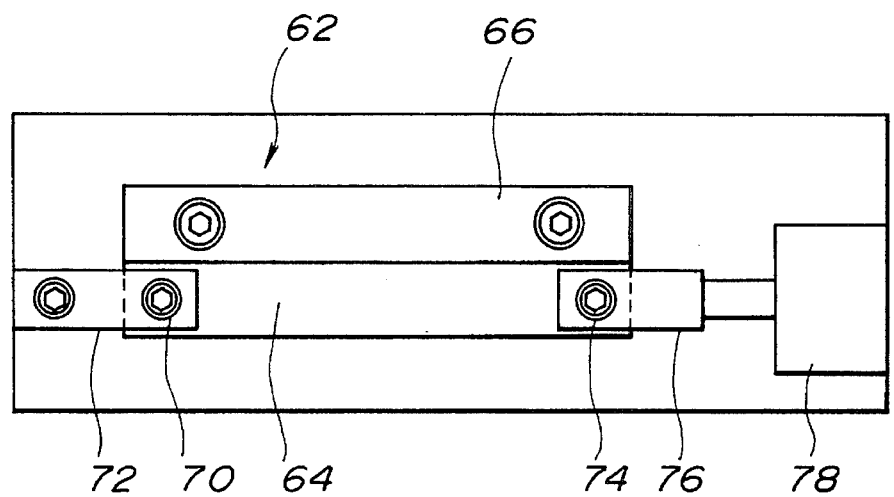
FIG. 7 is a plan view showing a seventh embodiment of the scale plate arrangement, in which a scale plate is welded to a scale-plate base having a recess under the condition that the scale plate is tensioned.
Figure 8:
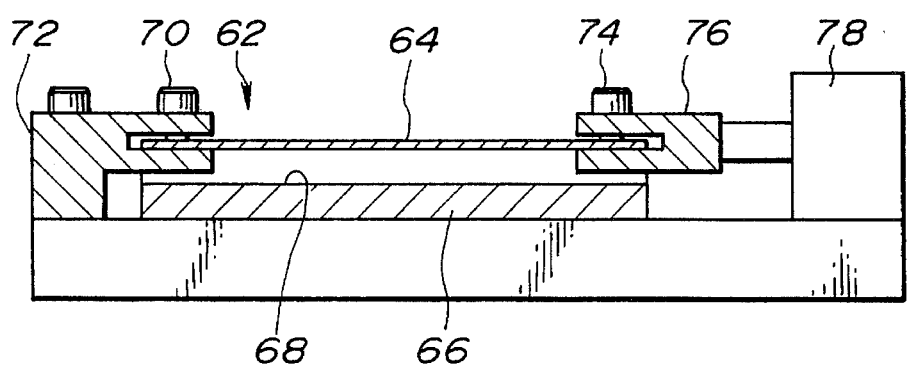
FIG. 8 is an elevational sectional view of the seventh embodiment of the scale arrangement.

It is optional to provide a scale-plate base with two or more recesses in case that a scale plate has a plurality of tracks. For example, FIG. 4 shows a fourth embodiment of a scale plate arrangement 42 according to the present invention, in which a scale-plate base 44 has two recesses 46 which are respectively positioned under tracks of a scale plate 48. As is seen from FIG. 4, an intermediate bank 50 of welding spots which is positioned between first and second banks 52 and 54 of welding spots is optionally provided.

According to scale plate arrangements 10, 28, 36 and 42 shown in FIGS. 1–4, each longitudinal bank of welding spots has certain regular intervals between each welding spot, and each welding spot of one longitudinal bank of welding spots is opposed to the corresponding welding spot of another longitudinal bank of welding spots in a transverse direction which is perpendicular to a longitudinal direction of the scale plate. However, as is shown by a fifth embodiment of a scale plate arrangement 56 according to the present invention in FIG. 5, it is optional that positions of welding spots are varied and that each longitudinal bank of welding spots has irregular intervals between each welding spot.

As to the welding manner, resistance welding, laser beam welding and the like can be taken. The welding manner is not limited to a particular one. For example, as is shown by a sixth embodiment of a scale plate arrangement 58 according to the present invention in FIG. 6, seam welding 60 can be made. The laser beam welding can be conducted in a small space because spot diameter of the laser beam welding can be less than 1 mm. If welding spots project, they may be removed by grinding.

When a scale plate undulates and the undulating scale plate is welded to a scale-plate base, the welded scale plate also tends to undulate between welding spots. With this, a desirable position detection can not be obtained. In view of this, there is provided a seventh embodiment of a scale plate arrangement 62 according to the present invention shown in FIGS. 7 and 8. In the scale plate arrangement 62, a scale plate 64 is welded to a scale-plate base 66 under the condition that the scale plate 64 is tensioned. With this, undulation of the scale plate 64 is corrected. In other words, the scale plate 64 becomes substantially flat and is placed on the scale-plate base 66 without having gaps therebetween. Under this condition, the scale plate 64 is welded to the scale-plate base 66. In fact, the scale-plate base 66 is substantially similar to the scale-plate base 32 shown in FIG. 2 in construction. Therefore, the scale-plate base 66 has a recess (no numeral) and is the same as the scale plate 64 in length in a longitudinal direction. Designated by numeral 68 is a bottom horizontal surface of the recess. Similar to the scale plate arrangement 28 shown in FIG. 2, first and second lateral end portions of the scale plate 64 which extend in a longitudinal direction are placed on and welded to a top surface of the scale-plate base 66. A method of preparing the scale plate arrangement 62 will be briefly described in the following.

At first, the scale plate 64 is placed on the scale-plate base 66, and then the scale plate 64 is clamped by a first clamping bolt 70 of a first clamp 72 and a second clamping bolt 74 of a second clamp 76. Then, the second clamp 76 is moved in the right direction in FIG. 8 by a tension mechanism 78 so as to tension the scale plate 64. Then, the scale plate 64 is welded to the scale-plate base 66 under the condition that the scale plate 64 is tensioned.

According to the scale plate arrangement 62, the scale plate 64 can have an arbitrary length in a longitudinal direction because the second clamp 76 is movable relative to the first clamp 72 in a longitudinal direction. To tension the scale plate 64, any means such as a spring, a weight and a bolt can be employed.

Figure 9:
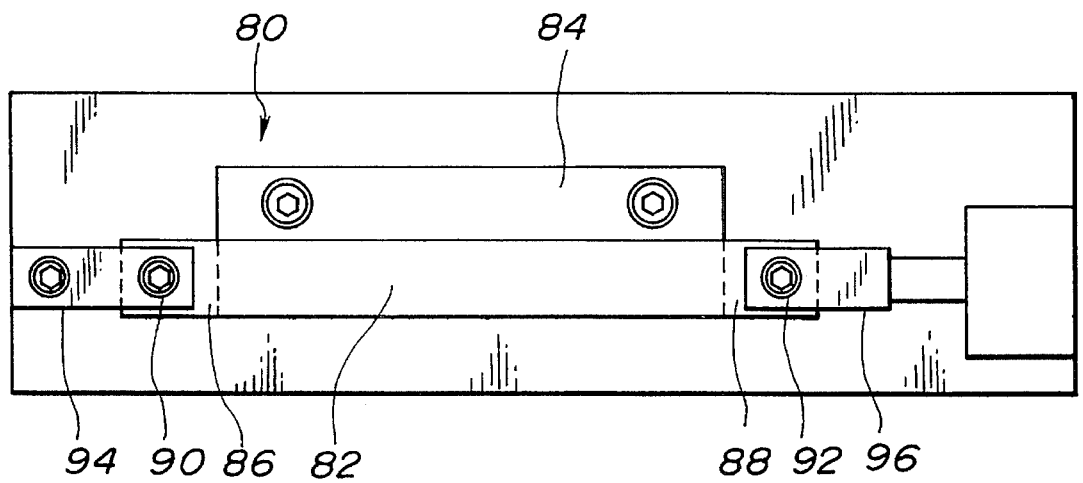
FIG. 9 is a view similar to FIG. 7, but showing an eighth embodiment of the scale plate arrangement, in which a scale plate is longer than a scale-plate base in length in a longitudinal direction.

FIG. 9 shows an eighth embodiment of the scale plate arrangement according to the present invention, which is substantially similar to the Seventh embodiment. The scale plate arrangement 80 has a scale plate 82 which is longer than a scale-plate base 84 in a longitudinal direction. Similar to the scale plate arrangement 10 shown in FIG. 1, the scale-plate base 84 does not have a recess. Thus, the scale plate has first and second extended portions 86 and 88 to be clamped by first and second clamping bolts 90 and 92. A method of preparing the scale plate arrangement 80 will be briefly described in the following.

At first, the scale plate 82 is placed on the scale-plate base 84. Then, the first and second extended portions 86 and 88 of the scale plate 82 are clamped by the first and second clamping bolts 90 and 92 of first and second clamps 94 and 96. Then, the second clamp 96 is moved in the right direction so as to tension the scale plate 82. Then, the scale plate 82 is welded to the scale-plate base 84 under the condition that the scale plate 82 is tensioned. Then, the first and second extended portions 86 and 88 of the scale plate 82 are removed.

This method can be employed even if a scale-plate base has a recess.

According to the second, third, fourth and seventh embodiments of the scale plate arrangement, there is provided at least one recess functioning as a non-magnetic layer. Therefore, according to these embodiments, a non-magnetic member can be omitted. This decreases the production cost of the scale plate arrangement and makes a better position detection possible.

What is claimed is:

1. A scale plate arrangement comprising:

a scale-plate base having a first surface, and a scale-plate having second and third opposite surfaces and having a scale on said third surface, said second surface of said scale plate being supported by and welded to said first surface of said scale-plate base, said first surface of said scale-plate base being welded along a longitudinal line on the third surface of the scale-plate, wherein said first surface of said scale-plate base and said second surface of said scale-plate are mutually opposing surfaces.

2. A scale plate arrangement as claimed in claim 1, wherein said scale plate has an implementation area containing said scale, and said scale is a magnetic scale, and wherein said scale-plate base is made of a magnetic material and has a recess positioned under the implementation area so that magnetic influence of said scale-plate base on the magnetic scale is prevented by the recess.

3. A scale plate arrangement as claimed in claim 1, wherein said scale-plate base is made of one selected from the group consisting of iron and stainless steel.

4. A scale plate arrangement as claimed in claim 1, wherein said scale-plate base is higher than said scale plate in rigidity.

5. A scale plate arrangement as claimed in claim 1, wherein said scale plate is welded to said scale-plate base by spot welding.

6. A scale plate arrangement as claimed in claim 1, wherein said scale plate is welded to said scale-plate base by laser beam spot welding with a spot diameter of about 1 mm.

7. A scale plate arrangement as claimed in claim 1, wherein said scale plate is welded to said scale-plate base by seam welding.

8. A scale plate arrangement as claimed in claim 1, wherein said scale plate is welded to said scale-plate base under the condition that said scale plate is tensioned.

9. A scale plate arrangement as claimed in claim 2, wherein said recess is filled with a non-magnetic material.

10. A scale plate arrangement as claimed in claim 2, wherein said implementation area has a second magnetic scale, and wherein said scale-plate base has at least two recesses positioned under the implementation area so that magnetic influence of said scale-plate base on the magnetic scales is prevented by the recesses.

11. A scale plate arrangement as claimed in claim 8, wherein said scale plate is tensioned by using one selected from the group consisting of spring, weight, and bolt.

12. A scale plate arrangement as claimed in claim 2, wherein said scale plate is welded to said scale-plate base under the condition that said scale-plate is tensioned.

* * * * *